United States Patent
Tiwari

(10) Patent No.: US 7,142,452 B1
(45) Date of Patent: Nov. 28, 2006

(54) METHOD AND SYSTEM FOR SECURING DATA IN A MULTI-TIME PROGRAMMABLE NON-VOLATILE MEMORY DEVICE

(75) Inventor: Vipin Kumar Tiwari, Fremont, CA (US)

(73) Assignee: Virage Logic Corporation, Fremont, CA (US)

( * ) Notice: Subject to any disclaimer, the term of this patent is extended or adjusted under 35 U.S.C. 154(b) by 0 days.

(21) Appl. No.: 11/077,654

(22) Filed: Mar. 10, 2005

Related U.S. Application Data

(60) Provisional application No. 60/577,897, filed on Jun. 7, 2004.

(51) Int. Cl.
*G11C 16/04* (2006.01)

(52) U.S. Cl. .................. 365/185.04; 365/195

(58) Field of Classification Search ........... 365/185.04, 365/195, 189.01, 189.07, 228
See application file for complete search history.

(56) References Cited

U.S. PATENT DOCUMENTS

| | | | | |
|---|---|---|---|---|
| 4,813,024 A | * | 3/1989 | Lisimaque et al. .... | 365/185.04 |
| 5,119,336 A | * | 6/1992 | Itoh .................. | 368/195 |
| 5,937,430 A | * | 8/1999 | Saitoh et al. .......... | 711/138 |
| 5,954,817 A | | 9/1999 | Janssen et al. | |
| 6,104,637 A | * | 8/2000 | Seo .................. | 365/185.24 |
| 6,445,606 B1 | | 9/2002 | Khoury | |
| 6,518,823 B1 | | 2/2003 | Kawai | |
| 6,707,696 B1 | | 3/2004 | Turner et al. | |
| 6,788,574 B1 | | 9/2004 | Han et al. | |
| 6,792,528 B1 | | 9/2004 | Hou | |
| 6,842,375 B1 | | 1/2005 | Raszka | |
| 6,850,446 B1 | | 2/2005 | Raszka et al. | |
| 6,992,938 B1 | | 1/2006 | Shubat et al. | |

\* cited by examiner

*Primary Examiner*—Gene N. Auduong
(74) *Attorney, Agent, or Firm*—Blakely, Sokoloff, Taylor & Zafman LLP

(57) ABSTRACT

A method and system for storing secure data in a multi-time programmable, non-volatile electrically-alterable memory device are disclosed. Accordingly, in an embodiment, a memory device may include a data register with a fixed N-bit pattern, comparator logic, control logic, and an array of non-volatile electrically-alterable memory cells. Each memory cell includes a floating gate to store an electronic charge representing the logical state of the memory cell. The plurality of memory cells may be logically partitioned to include an N-bit secure lock and a plurality of memory cells for storing secure data. The random bit values stored in the N-bit secure lock are read, and compared with the fixed N-bit pattern stored in the data register. If the N-bit patterns do not match, the control logic allows the plurality of memory cells for storing secure data to be programmed with secure data.

21 Claims, 6 Drawing Sheets

METHOD AND SYSTEM FOR SECURING DATA IN A MULTI-TIME PROGRAMMABLE NON-VOLATILE MEMORY DEVICE

RELATED APPLICATIONS

The present application is related to and claims the benefit of the filing date of U.S. Provisional Patent Application with Ser. No. 60/577,897, filed on Jun. 7, 2004, which is hereby incorporated herein by reference.

TECHNICAL FIELD

Embodiments of the invention relates generally to non-volatile memory devices, and in particular, to a method and system for securing data in a multi-time programmable, non-volatile memory device.

BACKGROUND

A one-time programmable (OTP) memory device is a non-volatile memory device that can be programmed (e.g., written to), but cannot be erased. Consequently, after an OTP memory device has initially been programmed, the data content of the memory device cannot be erased or altered. As a non-volatile memory device, OTP memory devices retain data even when power is not supplied to the memory device. Because of these characteristics, system designers often select OTP memory devices for storing data that the system designer desires to protect from being altered and/or discovered by a user, particularly a hacker. For example, embedded OTP memories are often used for storing identifying data (e.g., electrical serial numbers (ESNs), passwords, etc.) that uniquely identify and associate a user with a particular computer chip or integrated circuit (IC), such as an application specific integrated circuit (ASIC), or a System-on-a-Chip (SoC).

A typical OTP memory device is made up of an array of memory cells. Each memory cell includes some type of physically alterable element, such as a fuse, that is physically altered when subjected to a high voltage during the initial programming of the memory cell. After the initial programming, the physically altered element (e.g., blown fuse) prevents the memory cell from being written to or erased. This prevents a user from altering the data contents of the memory device after the device has been initially programmed. Furthermore, if proper access control logic is implemented, the data contents of an embedded OTP memory should not be available on the output pins of the chip, and consequently, a user should not be able to gain access to the data contents via normal operation of the chip.

However, the data contents of an OTP memory device are susceptible to discovery by a sophisticated user via several methods. First, because of the physical alteration of the programming element (e.g., the fuse) during the initial programming of the memory device, the data contents of the memory device may be physically discoverable with the aid of a microscope. Furthermore, various other probes (e.g., an x-ray probe, an electron beam probe, etc.) may be utilized to discover the data contents of an OTP memory device, particularly during power-up or power-down sequences when the electrical characteristics of the OTP memory cells change from their initial state to their programmed state, or vice versa.

A multi-time programmable (MTP) memory device is made up of an array of memory cells, each memory cell having what is referred to as a "floating gate." An electrically alterable, non-volatile memory device (e.g., a flash memory), which can be electrically programmed, is a particular type of MTP memory device. FIG. 1 illustrates a schematic diagram of a prior art electrically alterable, non-volatile memory cell 10 with a floating gate 12. The floating gate 12 is a polysilicon charge-storing element in the structure of the memory cell 10 that is isolated from the control gate 14, above, and the N-Channel device, below, by an insulating material (e.g., field oxide 16). The logical state of the memory cell 10 is determined by the charge on the floating gate 12, which is moved into and out of the floating gate 12 via the tunnel oxide 18 by physical mechanisms, such as a Fowler-Nordheim tunneling mechanism.

Unlike OTP memory devices, the data contents of an MTP memory device cannot be determined by physically inspecting the MTP memory device. Moreover, unlike OTP memory devices, x-ray and electron beam probes are not effective for discovering the data contents of MTP memory devices. However, MTP memory devices are erasable and re-writeable. Consequently, they are generally not well suited for storing secure data that a system designer desires to protect from alteration.

SUMMARY OF THE DESCRIPTION

A method and system for storing secure data in a multi-time programmable, non-volatile memory device are disclosed. Accordingly, a non-volatile memory device includes a plurality of memory cells—each memory cell including a floating gate to store an initial bit value. The initial bit values of N number of non-volatile memory cells are read. Next, the initial bit values of the N number of non-volatile memory cells are compared with a pre-determined N-bit pattern. If the initial bit values of the N number of non-volatile memory cells do not match the pre-determined N-bit pattern, a second group of non-volatile memory cells may be programmed with secure data that is not readable external to an apparatus containing the N number of non-volatile memory cells. Finally, the N number of non-volatile memory cells are programmed with the pre-determined N-bit pattern.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system for securing data in a multi-time programmable (MTP), non-volatile memory device are described. In the following description, for purposes of explanation, numerous specific details are set forth in order to provide a thorough understanding of the present invention. It will be evident, however, to one skilled in the art that the present invention may be practiced without these specific details.

In general, a plurality of non-volatile memory cells are fabricated such that each memory cell has a charge-storing element (e.g., a floating gate) to store an electric charge, which determines the logical state of the memory cell. As a result of the manufacturing process, each memory cell in the memory array may initially be in an unknown state. For example, the charge-storing element (e.g., the floating gate) of each memory cell in the array may hold enough charge to represent a logical "1", or alternatively, will have little or no charge and will therefore represent a logical "0". The plurality of memory cells may be logically partitioned to include N memory cells for storing an N-bit secure lock, and a plurality of memory cells for storing secure data. The bit values of the N-bit secure lock are read, and compared with a pre-determined, or fixed, N-bit pattern stored in a data register. If the initial bit values read from the N-bit secure lock do not match the fixed N-bit pattern from the data register, then the plurality of memory cells for storing secure data are programmed with secure data. In addition, the fixed N-bit pattern is written to, or programmed into, the N memory cells comprising the N-bit secure lock. At any time subsequent to programming the secure lock with the fixed N-bit pattern, when the N-bit fixed pattern in the data register is compared with the data contents of the N-bit secure lock, the two N-bit patterns will match. Accordingly, control logic prevents the plurality of memory cells for storing secure data to be re-programmed (e.g., re-written or erased) when the two N-bit patterns match.

Figure 1:
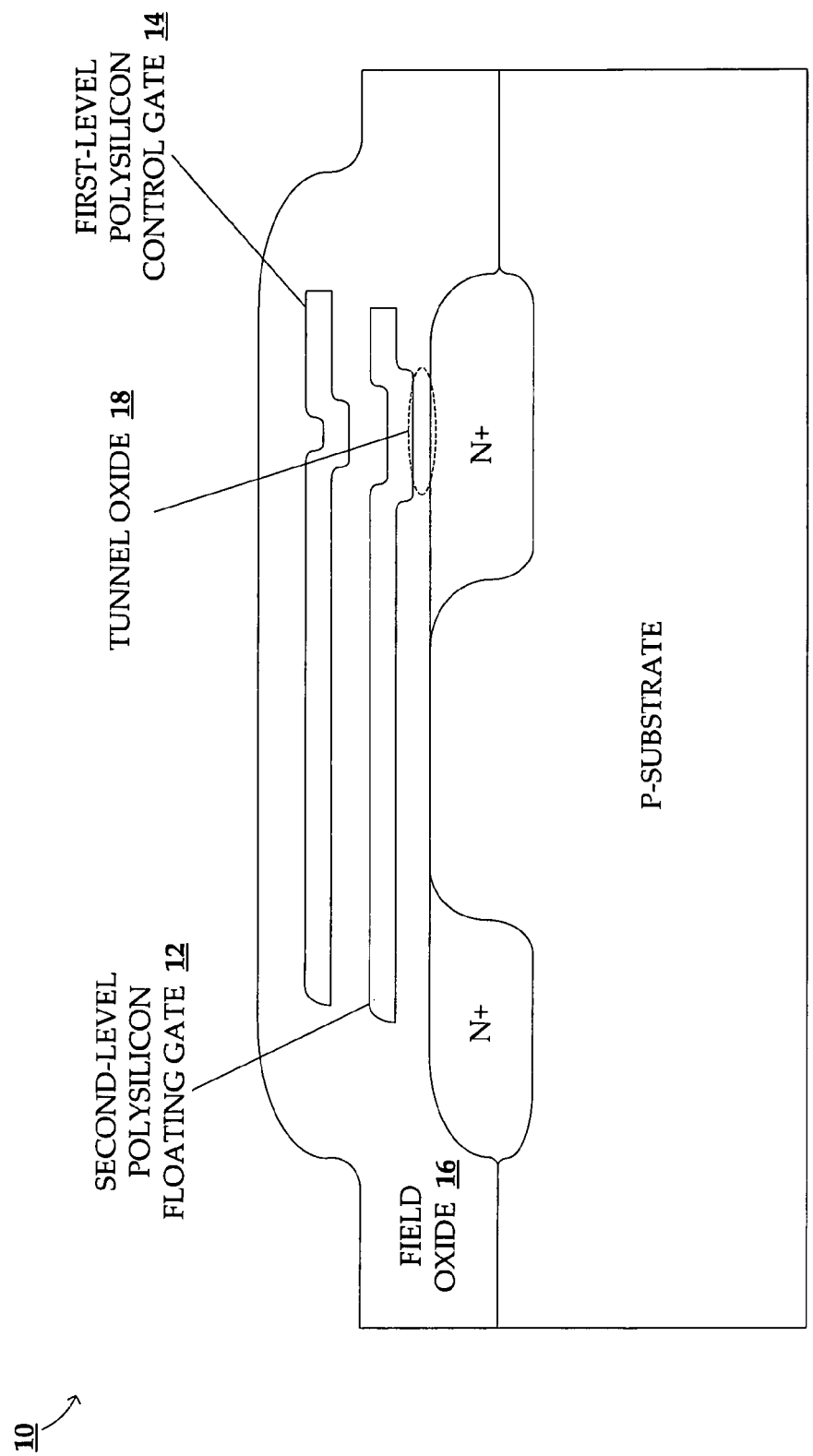
FIG. 1 illustrates a schematic diagram of a prior art electrically alterable, non-volatile memory cell with a floating gate.
Figure 2:
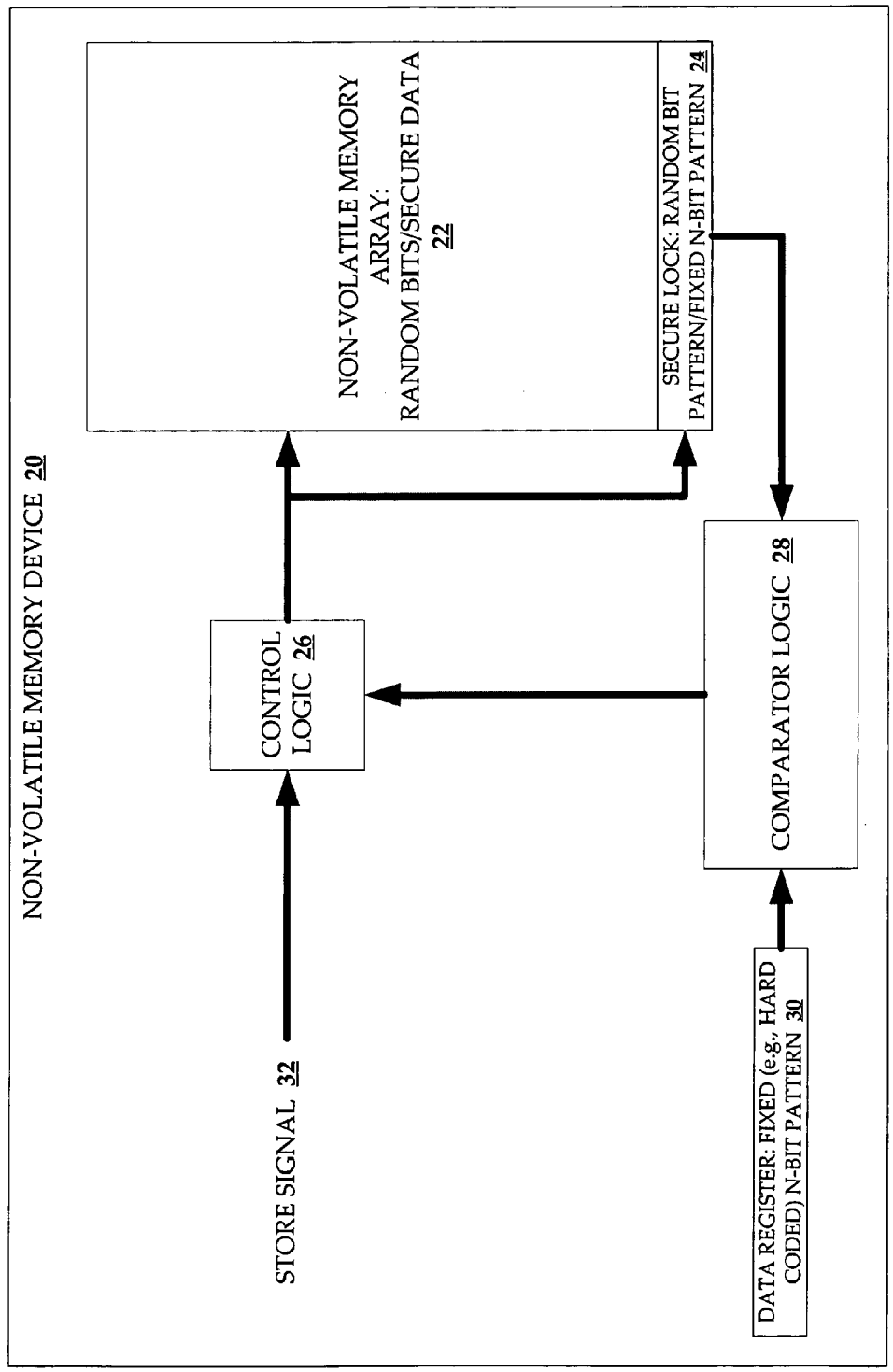
FIG. 2 illustrates a block diagram of logical components included in an embodiment of a non-volatile memory device for securely storing data.

FIG. 2 illustrates a block diagram of logical components included in an embodiment of a non-volatile memory device 20 for securely storing data. The memory device 20 includes an array of MTP, non-volatile memory cells 22. In one embodiment, the MTP memory cells may be electrically alterable. It will be appreciated that any electrically alterable, non-volatile memory cell having a floating gate may be used to store the secure data. For example, in one embodiment, each memory cell in the array 22 may be consistent with the prior art memory cell 10 illustrated in FIG. 1. Alternatively, the non-volatile memory array 22 may be made up of electrically alterable, non-volatile memory cells such as those described in U.S. Pat. No. 6,788,574 to Han et al., which is hereby incorporated herein by reference.

It will also be appreciated that the number of memory cells in the memory array 22 may vary depending on the particular requirements of the system of which the memory device is a part. For example, in one embodiment, the non-volatile memory array 22 may be 512 total bytes, arranged in 128 rows, each row having 32 bits. Furthermore, in one embodiment, the memory array 22 may be logically partitioned to include a secure data storage portion for storing secure data and a secure lock portion 24 for storing a fixed bit pattern of a predetermined length. As will be explained in greater detail below, to "lock" the secure data, the secure lock 24 may be programmed with a fixed bit pattern after the secure data storage portion has been programmed with secure data.

In addition to the memory array 22, the memory device 20 may include control logic 26, comparator logic 28, and a data register 30. It will be appreciated that the embodiment of the memory device 20 illustrated in FIG. 2 is provided as an example. In various alternative embodiments, one or more logical blocks shown in FIG. 2 may be combined or separated, for example, by function.

Referring again to FIG. 2, as its name suggests, the control logic 26 controls programming access to the non-volatile memory array 22. For example, in one embodiment, the control logic 26 may receive a "STORE" programming signal 32 from a source external to the memory device 20 or from a source external to the chip on which the memory device 20 is embedded. In any case, the control logic 26 may prevent or allow programming of the non-volatile memory array 22 based on whether a bit-pattern stored in the secure lock 24 of the memory array 22 matches a fixed bit pattern stored in a data register 30. For example, in one embodiment, the control logic 26 may be configured to only allow the non-volatile memory array 22 to be programmed if the bit patterns do not match.

Due to the inherent randomness involved in the fabrication of non-volatile memory arrays, the initial bit value of each memory cell in the memory array 22 may be unknown immediately after fabrication. Consequently, if the size (e.g., number of bits) of the secure lock 24 is selected to be sufficiently large, the statistical likelihood that the bit pattern stored in the secure lock 24 will match a known, fixed, bit pattern is negligible. For example, if the secure lock is implemented as 32 bits, the odds that a 32-bit fixed bit pattern will match the unknown 32-bit pattern are one in two to the power of thirty-two (or, 4,294,967,296). Furthermore, if the secure lock is greater than 32 bits, the statistical likelihood of a match occurring is even less.

After the control logic 26 has allowed the non-volatile memory array 22 to be programmed, the secure lock 24 is programmed with the fixed bit pattern that is stored in the data register 30. This will prevent the memory array 22 from being programmed in the future. For example, because the fixed bit pattern is written to the secure lock 24 after the initial programming of the memory array 22, the next time a "STORE" programming signal 32 is received at the control logic 26, the control logic 26 will prevent programming of the memory array 22 because the bit pattern stored in the secure lock 24 will match the fixed bit pattern stored in the data register 30.

The memory device 20 may include comparator logic 28 for comparing the bit pattern stored in the secure lock 24 with the fixed bit pattern stored in the data register 30. Accordingly, the comparator logic 28 may have the secure lock's bit pattern and the data register's fixed bit pattern as inputs. In addition, the comparator logic 28 may communicate an output signal to the control logic 26 indicating the matching (or non-matching) status of the bit patterns.

The bit pattern stored in the data register 30 may be fixed (e.g., hard-coded), so that it is permanently set in hardware. By utilizing a fixed, or hard-coded bit pattern in the data register 30, hackers will be prevented from tampering with the bit pattern of the data register 30 in an effort to match the bit pattern in the secure lock 24 and overwrite, or erase, the secure data stored in the non-volatile memory array. Accordingly, the data register 30 of the memory device 20 may be a read only memory (ROM) device.

Figure 3:
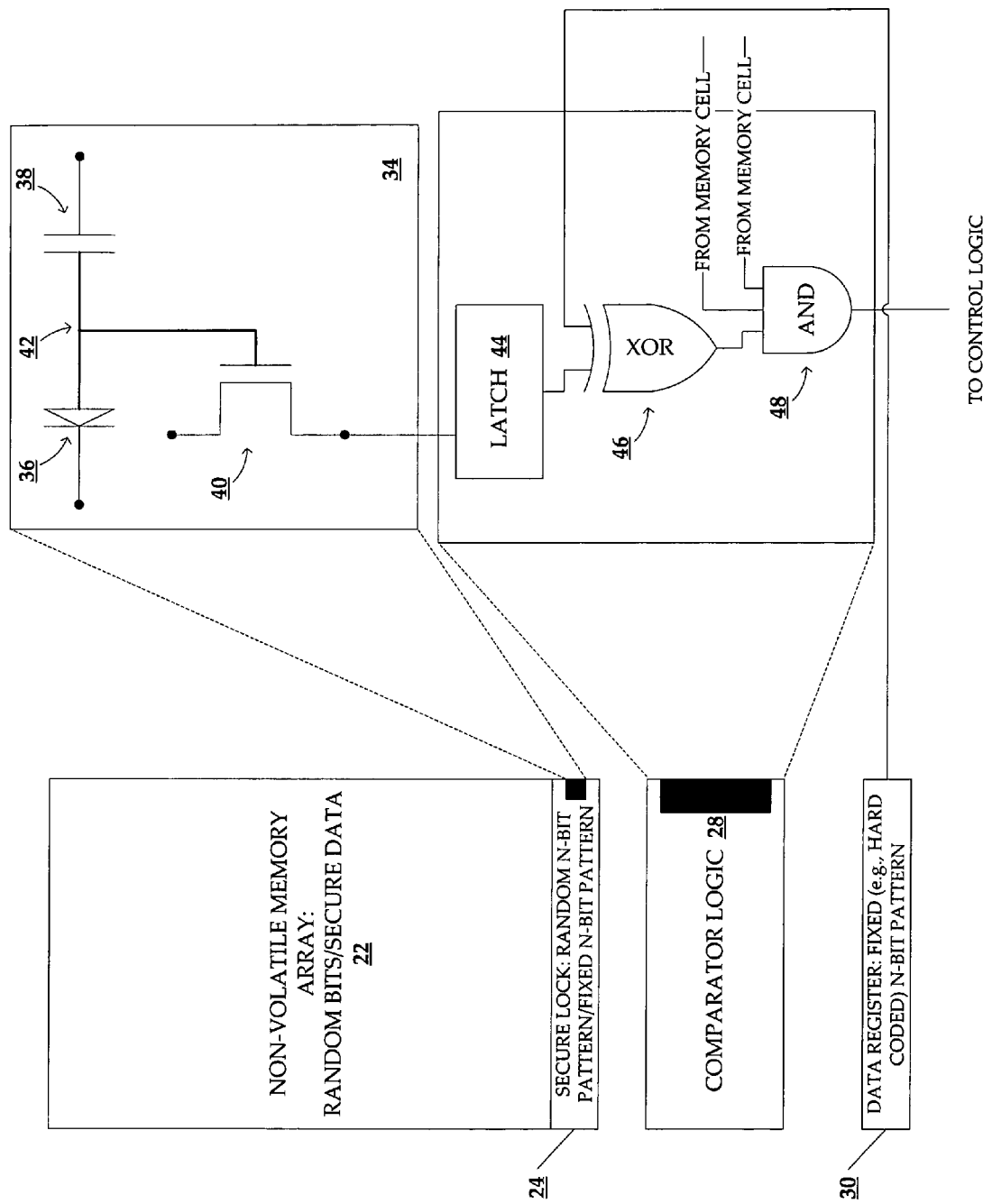
FIG. 3 illustrates a schematic diagram of logical components included in one embodiment of a non-volatile memory device for securely storing data.

FIG. 3 illustrates a schematic diagram of logical components included in one embodiment of a non-volatile memory device for securely storing data. In one embodiment, the electrically alterable, non-volatile memory cell 34 may consist of a tunneling capacitor 36, a coupling capacitor 38 and a read transistor 40. These three components may share a single floating gate 42. The coupling capacitor 38, in conjunction with the tunneling capacitor 36, form the charging-storing element. The charge-storing element is operable to facilitate programming and erasing of a data bit stored in the electrically alterable, non-volatile memory cell 34. The read transistor 40, which makes up a bit sensing component, communicates a bit value stored in the electrically alterable, non-volatile memory cell 34 during a read operation. Thus, a charge operation enables retention of data after the power is turned off while the sense operation allows the previously stored data to be accessed after powering the memory back up.

In one embodiment, the memory device is configured so that the output of each memory cell 34 of the secure lock 24 is routed to comparator logic 28. The comparator logic 28 may include a latch component 44 to store the bit value from each memory cell 34 in the secure lock 24. Accordingly, if the secure lock 24 is a 32-bit lock, the latch component 44 will have 32 individual latches in parallel to store the 32-bit pattern in the secure lock 24. In addition the comparator logic 28 may include a series of XOR logic gates 46. Accordingly, each XOR logic gate 46 may have as its inputs one bit from the secure lock 24 (e.g., via the latch 44), and one bit from the fixed bit pattern (e.g., via the data register 30). Again, if the secure lock 24 is a 32-bit lock, the comparator logic 28 may include 32 XOR gates—one for each bit of the 32 bit secure lock 24 and fixed 32-bit pattern. The output from each XOR logic gate 46 may be routed to the input of an AND logic gate 48. Accordingly, the AND logic gate 48 may have an input for each bit of the 32-bit pattern. The output of the AND logic gate 48 may be routed to the control logic 26. Thus, in one embodiment, if the fixed bit pattern stored in the data register 30 matches the bit pattern in the secure lock 24, a signal routed from the comparator logic 28 to the control logic 26 may be asserted, thereby preventing the memory array 22 from being programmed (e.g., written to, or erased).

Figure 4:
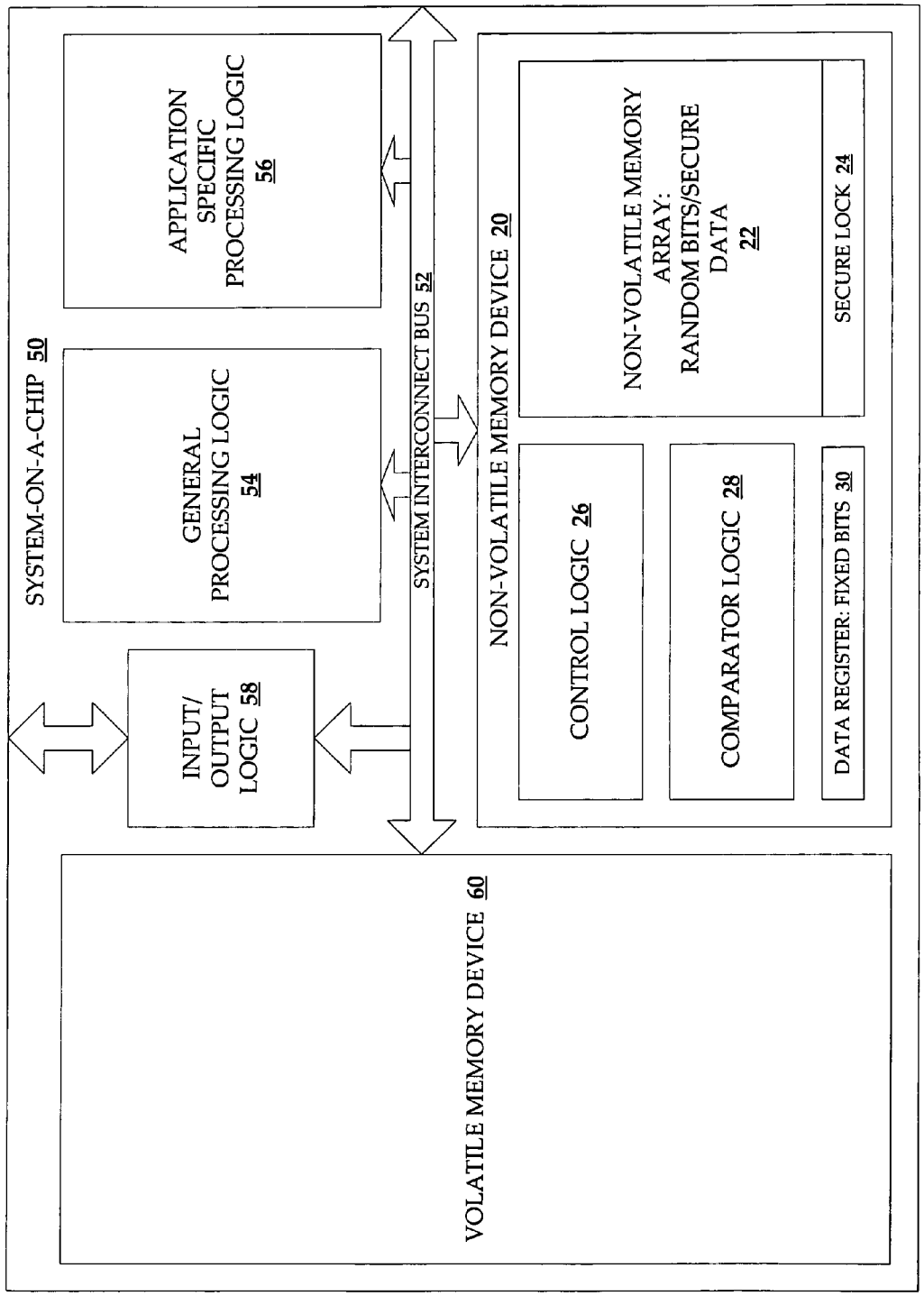
FIG. 4 illustrates a block diagram of logical components in a System-on-a-Chip, including an embodiment of a non-volatile memory device for securely storing data.

FIG. 4 illustrates a block diagram of logical components in a System-on-a-Chip (SoC) 50, including an embodiment of an embedded non-volatile memory device 20 for securely storing data. The SoC 50 may include a memory device 20 with an array of non-volatile memory cells 22, a secure lock 24, control logic 26, comparator logic 28, and a data register 30 for storing a fixed bit pattern. In addition, the SoC 50 may include a system interconnect bus 52 (e.g., data bus, and/or address bus) that interconnects the non-volatile memory device 20 with general processor logic 54, application specific processor logic 56, input/output logic 58, and a volatile memory device 60. In a typical SoC, a non-volatile memory device (not shown) stores boot-up instructions that are executed by the general processor logic 54 when the system is powered on. Depending on the particular system and application, the general processor logic 54 of the SoC may execute software programs stored as a sequence of instructions in various memory devices, such as the embedded non-volatile memory device with reference number 20. In addition, the application specific processor logic 56 may process data while the input/output logic 58 may send and receive data to various other external/internal components (not shown).

Figure 5:
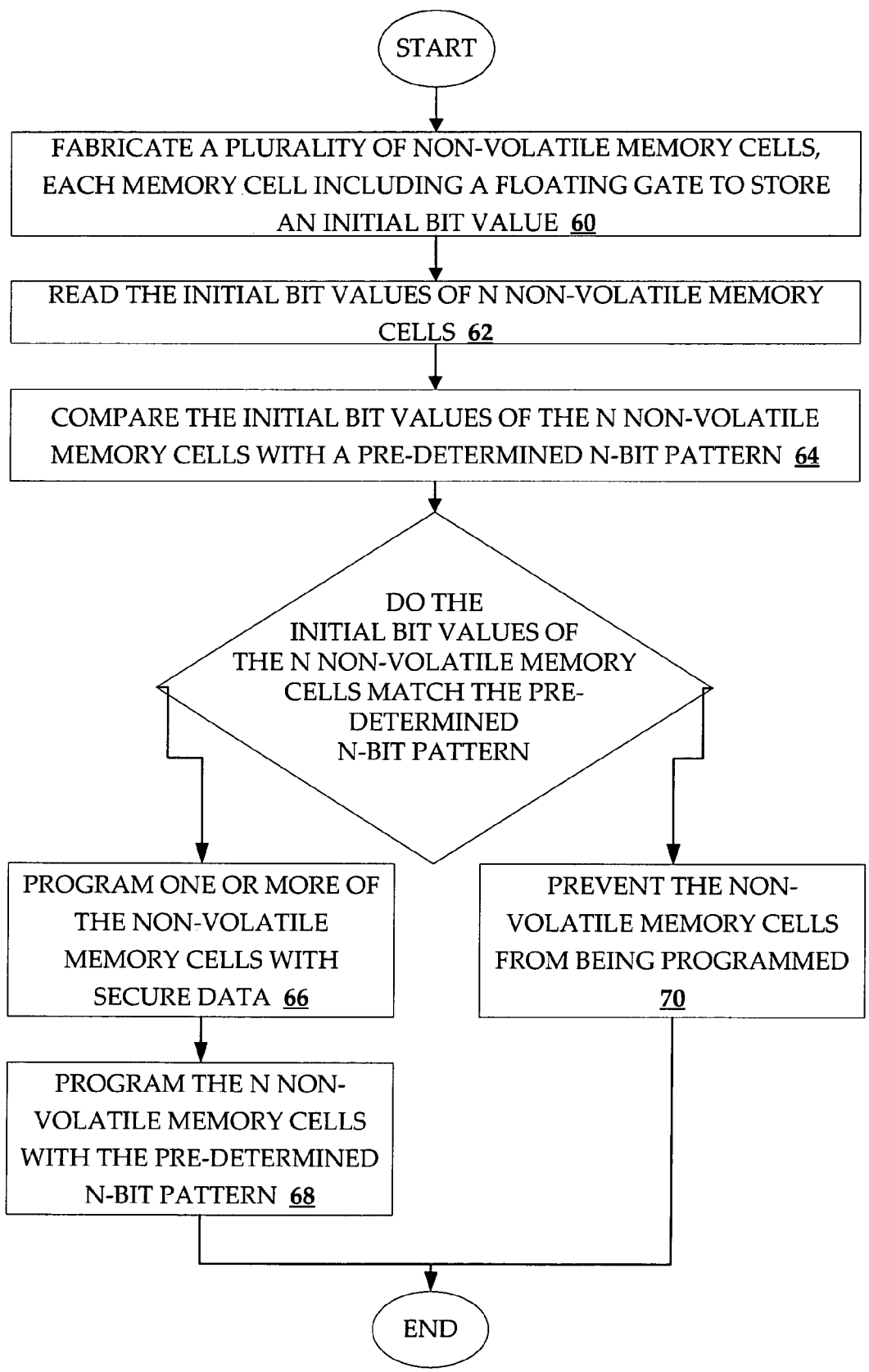
FIG. 5 illustrates a flow chart of the operations of a method, consistent with an embodiment of the invention, for securely storing data in a non-volatile memory device.

FIG. 5 illustrates a flow chart of the operations of a method, consistent with an embodiment of the invention, for securely storing data in a non-volatile memory device. At operation 60, an array of MTP non-volatile memory cells are fabricated. In one embodiment, each memory cell in the array includes a floating gate to store an electric charge that determines the logical state of the memory cell. When the memory device is fabricated, the logical state of each memory cell may be unknown due to the inherent randomness of the fabrication process. Furthermore, the memory array may be logically partitioned to include one group of memory cells (e.g., a 32-bit row of cells) dedicated to storing a secure lock 24. The remainder of the memory cells may be dedicated to storing secure data.

At operation 62, the initial bit values of the secure lock 24 are read. For example, in one embodiment, the control logic 26 generates a signal that routes the bit values of the N-bit pattern in the secure lock 24 to a latch 44 that is part of the comparator logic 28.

At operation 64, the comparator logic 28 compares the initial bit values stored in the secure lock portion 24 of the memory array 22 with a predetermined, or fixed (e.g., hard-coded) N-bit pattern stored in a data register 30. If the initial bit values stored in the secure lock portion 24 of the memory array 22 do not match the fixed N-bit pattern stored in the data register 30, then at operation 66 the control logic 26 may generate a signal, or series of signals, to program, or allow programming of, the portion of the non-volatile memory array 22 dedicated to storing secure data. In addition, at operation 68, the fixed N-bit pattern is written to, or programmed into, the secure lock portion 24 of the memory array 22. This ensures that any future comparison results in a match, and accordingly, the control logic 26 will prevent any re-programming of the memory array 22.

If, at operation 64, it is determined that the initial bit values stored in the secure lock portion 24 of the memory array 22 match the fixed N-bit pattern stored in a data register, then, at operation 70, the control logic 26 blocks, or prevents, any programming (e.g., writing, re-writing, or erasing) of the non-volatile memory array 22.

Figure 6:
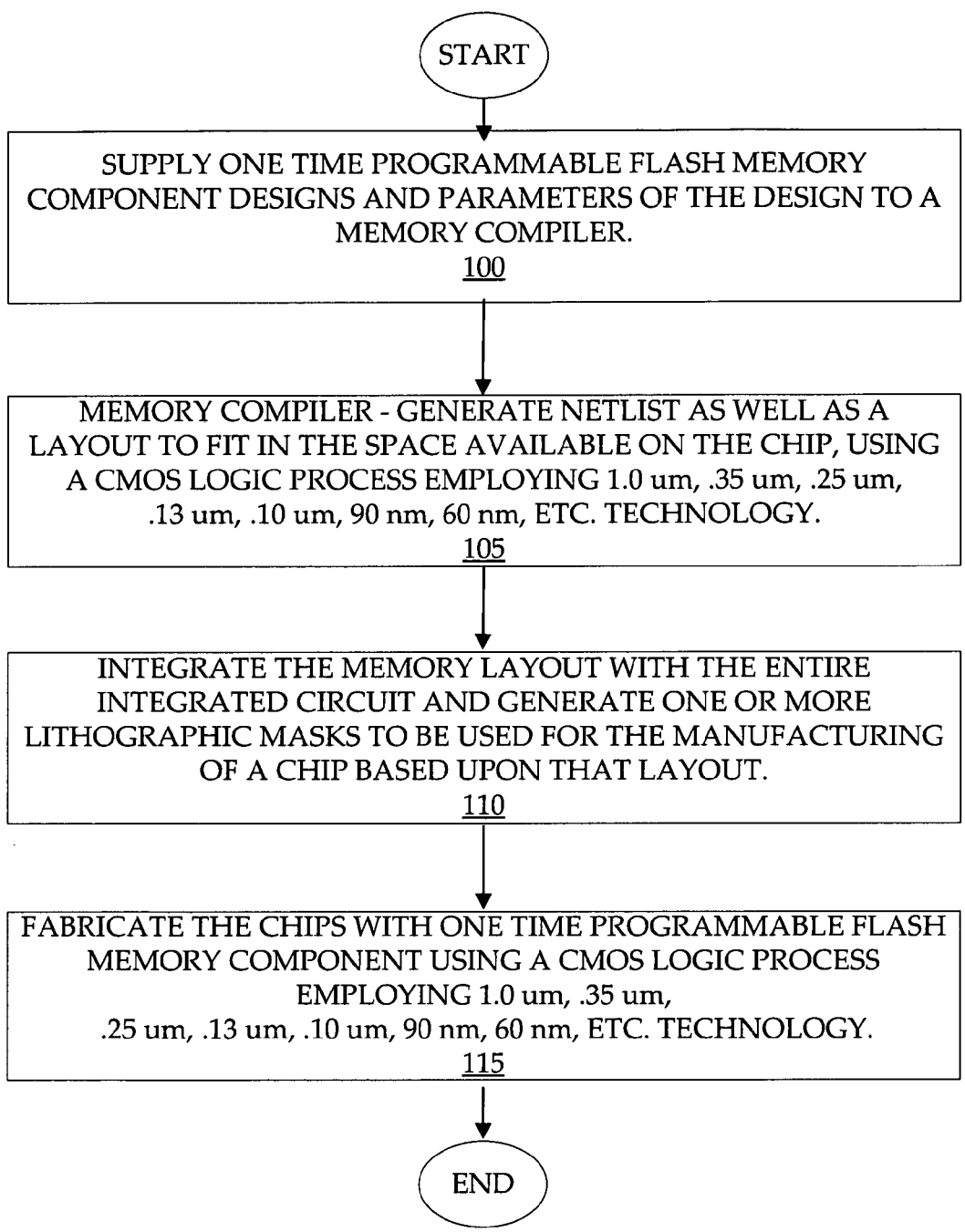
FIG. 6 illustrates an example of a process for generating an embedded memory, with secure data storage capabilities, from designs of memory components utilizing a memory compiler consistent with one embodiment of the invention.

FIG. 6 illustrates an example of a process for generating a non-volatile memory device for secure data storage from designs of memory components utilizing a memory compiler consistent with one embodiment of the invention. In block 100, the designs for each memory component for the non-volatile memory with secure data storage are supplied to the memory compiler, as well as other design parameters such as the number of columns and number of rows of the array, the available size on the chip and other parameters. Thus, the designs for a non-volatile memory with secure data storage may be supplied to the memory compiler. A memory compiler may be a software program comprised of multiple algorithms and designs for the purpose of generating a circuit design and a layout in a space available on a target chip. The set of application-specific algorithms and interfaces of the memory compiler may be used by system integrated circuit (IC) integrators to rapidly create hundreds of silicon-proven memory cores. The memory compiler may receive the memory component designs and utilize those memory component designs in conjunction with memory circuit designs to optimize a circuit design and layout in the space available on a target chip.

In block 105, the memory compiler may generate a netlist and a layout targeted to fit in the space available on a target chip. Typically, the memory compiler will store the data representing the non-volatile memory with secure data storage capabilities on a machine-readable medium. The memory compiler may select the memory component building blocks so that they are sized appropriately for the targeted fabrication technology. The memory compiler then may provide the memory layout to be used to generate one or more lithographic masks utilized in the fabrication of the non-volatile memory with secure data storage. The memory compiler may also provide a netlist for verification of the non-volatile memory.

In block 110, the generated memory layout may be integrated with the rest of the layout for the chip and a machine may generate the lithographic masks that contain the information necessary for the fabrication of a functional device. The machine may also generate one or more lithographic masks for transferring the circuit design onto the chip.

In block 115, a fabrication facility may fabricate one or more chips embedded with the non-volatile memory device utilizing the lithographic masks generated from the memory compiler's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 60 nm or less, to fabricate the chips. The size of the CMOS logic process employed typically defines the smallest minimum lithographic dimension that can be fabricated on the chip using the lithographic masks, which in turn, determines minimum component size. According to one embodiment, light may pass through these lithographic masks onto the chip to transfer the circuit design and layout for the non-volatile memory onto the chip itself. In one embodiment, the memory design compiler is designed for embedded applications in a standard CMOS logic process, defined according to the minimum line widths used in fabrication.

In one embodiment, a memory compiler may be implemented in software as a set of instructions stored on a machine-readable medium. A machine-readable medium may include any mechanism that provides (e.g., stores and/or transmits) information in a form readable by a machine (e.g., a computer). For example, a machine-readable medium may include, but not be limited to: read only memory (ROM); random access memory (RAM); magnetic disk storage media; optical storage media; flash memory devices; DVD's; electrical, optical, acoustical or other forms of propagated signals (e.g., carrier waves, infrared signals, digital signals); EPROMs; EEPROMs; FLASH, magnetic or optical cards; or any other type of media suitable for storing electronic instructions. Instruction on a slower medium could be cached to a faster, more practical medium.

In one embodiment, an example memory compiler may comprise the following: a graphic user interface, a common set of processing elements, and a library of files containing design elements such as circuits, control logic, and cell arrays that define the non-volatile memory device. In addition, one embodiment, a memory compiler may include object code in a set of executable software programs.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "allowing" or "preventing" or "programming" or "reading" or "writing" or "calculating" or "determining" or "displaying" or the like, refer to the action and processes of a computer system, electronic circuit, or similar electronic computing device, that manipulates and transforms data represented as physical (electronic) quantities within the computer system's registers and memories into other data similarly represented as physical quantities within the computer system memories or registers, or other such information storage, transmission or display devices.

Thus, a method and system for securely storing data in an MTP, non-volatile memory device have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
reading initial bit values of N number of non-volatile electrically-alterable memory cells, wherein each memory cell includes a floating gate to store an initial bit value;
comparing the initial bit values of the N number of non-volatile electrically-alterable memory cells with a pre-determined N-bit pattern; and
if the initial bit values of the N number of non-volatile electrically-alterable memory cells do not match the pre-determined N-bit pattern, programming a second group of non-volatile electrically-alterable memory cells with secure data that is not readable external to an apparatus containing the N number of non-volatile electrically-alterable memory cells, and programming the N number of non-volatile electrically-alterable memory cells with the pre-determined N-bit pattern.

2. The method of claim 1, further comprising:
if the initial bit values of the N number of non-volatile electrically-alterable memory cells do match the pre-determined N-bit pattern, preventing the second group of non-volatile electrically-alterable memory cells from being programmed.

3. The method of claim 2, wherein N is equal to or greater than 32.

4. The method of claim 2, wherein programming includes writing, re-writing or erasing, and being programmed includes being written, re-written or erased.

5. The method of claim 2, wherein the non-volatile electrically-alterable memory cells are fabricated utilizing a standard Complimentary Metal Oxide Silicon based logic fabrication process and the floating gate is fabricated with a single layer of polysilicon.

6. The method of claim 2, further comprising:
fabricating a system-on-a-chip, wherein the non-volatile electrically-alterable memory cells are included in the system-on-a-chip.

7. A machine-readable medium storing data representing a memory device configured to perform the method of claim 1.

8. The machine-readable medium of claim 7 storing a memory compiler to provide a design for one or more lithographic masks used in fabricating a memory device configured to perform the method of claim 1.

9. An apparatus comprising:
a data register having stored therein a fixed N-bit pattern;
an array of non-volatile electrically-alterable memory cells, each memory cell including a floating gate to store a bit value;
comparator logic to compare an N-bit pattern stored in N number of non-volatile electrically-alterable memory cells of the array of non-volatile electrically-alterable memory cells with the fixed N-bit pattern stored in the data register; and
control logic to prevent programming of the array of non-volatile electrically-alterable memory cells if the N-bit pattern stored in the N number of non-volatile electrically-alterable memory cells matches the fixed N-bit pattern stored in the data register.

10. The apparatus of claim 9, wherein, if the N-bit pattern stored in the N number of non-volatile electrically-alterable memory cells does not match the N-bit fixed pattern stored in the data register, the control logic is to:
program one or more of the non-volatile electrically-alterable memory cells of the array of non-volatile memory cells; and
program the N number of non-volatile electrically-alterable memory cells of the array of non-volatile electrically-alterable memory cells with the fixed N-bit pattern stored in the data register, thereby ensuring a future match and preventing further programming of the array of non-volatile electrically-alterable memory cells.

11. The apparatus of claim 10, wherein N is equal to or greater than thirty-two.

12. The apparatus of claim 10, wherein programming includes writing, re-writing or erasing.

13. The apparatus of claim 10, wherein the array of non-volatile electrically-alterable memory cells is fabricated utilizing a standard Complimentary Metal Oxide Silicon based logic fabrication process and the floating gate is fabricated with a single layer of polysilicon.

14. The apparatus of claim 10, wherein the non-volatile electrically-alterable memory cells are included in the system-on-a-chip.

15. The apparatus of claim 10, wherein the array of non-volatile electrically-alterable memory cells is logically partitioned to include a secure data storage portion for storing secure data and a secure lock portion for storing a fixed N-bit pattern, the secure lock programmed with the N-bit pattern only after the secure data storage portion has been programmed with secure data.

16. A machine-readable medium storing data that represents the apparatus of claim 10.

17. The machine-readable medium of claim 16 storing a memory compiler to provide a design for one or more lithographic masks used in fabricating the apparatus.

18. An integrated circuit comprising:
processing logic;
a volatile memory device;
a system interconnect bus connecting the processing logic and the volatile memory device; and
an array of non-volatile electrically-alterable memory cells, where each memory cell includes a floating gate to store a bit value, wherein the memory cells are logically partitioned to include an N-bit secure lock and a plurality of memory cells for storing secure data;
a data register having stored therein a fixed N-bit pattern;
comparator logic to compare the N-bit secure lock pattern stored in N number of non-volatile electrically-alterable memory cells of the array of non-volatile electrically-alterable memory cells with the fixed N-bit pattern stored in the data register; and
control logic to prevent programming secure data into the array of non-volatile electrically-alterable memory cells if the N-bit secure lock pattern stored in the N number of non-volatile electrically-alterable memory cells matches the fixed N-bit pattern stored in the data register, wherein the processing logic couples to the array of non-volatile electrically-alterable memory cells.

19. The integrated circuit of claim 18, wherein the integrated circuit is configured so as to prevent the data contents of the array of non-volatile electrically-alterable memory cells from being externally accessible.

20. A machine-readable medium storing data that represents the integrated circuit of claim 19.

21. The machine-readable medium of claim 20 storing a memory compiler to provide a design for one or more lithographic masks used in fabricating the integrated circuit.

* * * * *